Aug. 7, 1962    J. H. BARWELL ETAL    3,048,344
APPARATUS FOR USE IN CONJUNCTION WITH AN EXTRUDER
Filed Aug. 9, 1960
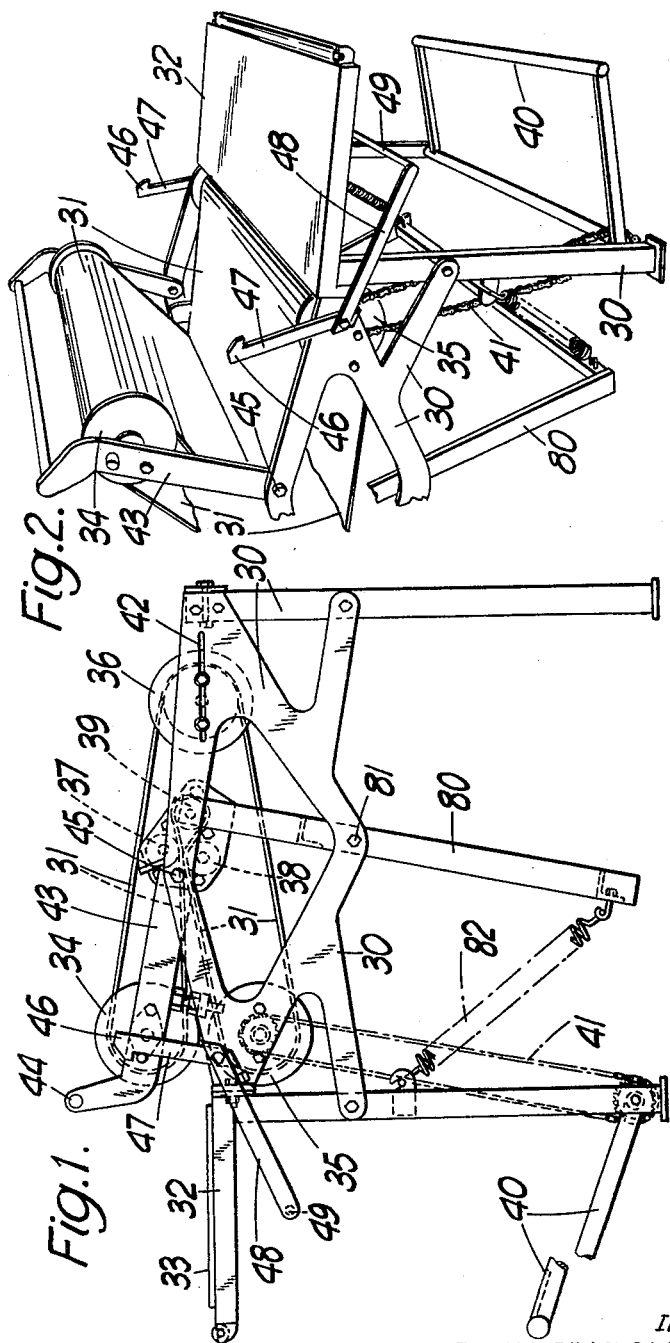
INVENTORS.
JOHN HAROLD BARWELL
DONALD JAMES LANHAM
BY
Merchant & Merchant
ATTORNEYS United States Patent Office 3,048,344
Patented Aug. 7, 1962

3,048,344
APPARATUS FOR USE IN CONJUNCTION WITH AN EXTRUDER
John Harold Barwell and Donald James Lanham, Cambridge, England, assignors to Barwell Rubber Company Limited, Cambridge, England, a British company
Filed Aug. 9, 1960, Ser. No. 48,458
Claims priority, application Great Britain Aug. 27, 1959
3 Claims. (Cl. 242—55)

This invention relates to apparatus for use in conjunction with an extruder operating on plastic material stock supplied in the form of sheets or ribbon.

The invention is particularly concerned with the production by extrusion of tread-forming strip known as camelback, having a thick middle portion of rectangular cross-section and tapering sides used in the remoulding or retreading of pneumatic tyres. The material of the camelback is a composition comprising milled unvulcanised rubber containing the usual compounding ingredients together with the necessary quantity of a vulcanising agent. The stock from which the camelback strip is formed is customarily supplied in rough sheets or slabs about ⅜" in thickness and about 3 feet square, or alternatively the stock may be in the form of a ribbon.

The object of the present invention is to provide apparatus for forming the stock sheets or ribbon into compact cylindrical rolls which may readily be charged into the barrel of the extruder.

The apparatus of the invention comprises an endless belt arranged for traversing over a guide track, and rollers defining the guide track and so disposed as to constrain the belt to provide two adjacent laps moving in opposite directions and affording a nip within which the stock sheets or ribbon may be received. The material, either as sheets or ribbon, fed into the nip is engaged on opposite faces by the opposite moving laps of belt and in consequence is rolled up into the form of a cylinder.

The apparatus may include a feed table for receiving the stock sheets or ribbon, the table being arranged to locate the sheets or ribbon for aligned presentation to the aforesaid nip between the oppositely moving laps of belt.

According to a further feature of the invention a hinged mounting may be provided for one of the guide rollers at the nip aforesaid, so arranged as to allow said roller to be moved at will to open the nip and so permit removal of the formed cylindrical roll of sheets. The belt may be driven by pedal operated means coupled to one of the guide track rollers or alternatively an electric motor or other power drive may be used.

The foregoing and other features of the invention are embodied in an example which will now be described with reference to the accompanying drawings in which:

FIGURE 1 is a view showing the roll former in side elevation, and

FIGURE 2 is a perspective view of part of the apparatus, showing the nip open for removal of the formed roll of sheets.

Like reference numerals indicate like parts in the two figures.

The roll-forming apparatus comprises a framework 30 supporting, through ball bearings, an assembly of guide rollers which are rotatable about horizontal axes and over which an endless belt or blanket 31 is arranged to be traversed. The framework includes a horizontal feed table 32 for receiving and locating the sheets 33 of camelback composition in position convenient for presentation to the roll former. The guide roller assembly comprises two front rollers 34, 35 located one above the other adjacent to and at the level of the feed table 32, a back roller 36, and, between the front and back rollers, an intermediate group of smaller rollers 37, 38, 39. The endless belt 31 is taken round the front and back rollers 34, 35, 36 and round the rear roller 39 of the intermediate group. The other two rollers 37, 38 of that group serve to hold the laps of the belt close together where they pass to and from the roller 39.

The belt is driven by a pedal 40 coupled by chains 41 with a pawl and ratchet-sprocket combination (not shown) associated with the lower roller 35 of the front pair. Alternatively an electric motor or other power drive may be used for traversing the belt. The back roller 36 has its axle adjustable horizontally in slots 42 in side members of the framework so as to vary the tension in the belt. The upper roller 34 of the front pair is carried at the ends of arms 43 (interconnected by a cross-bar 44) pivoted at 45 on the framework so as to be capable of being swung upwardly to permit removal of the rolled sheets. The arms 43 are arranged to be locked in their downward positions by hooks 46 formed on pivoted arms 47 operable by levers 48 interconnected by a cross-piece 49 extending underneath the table.

In operation, the traverse of the belt over the guide rollers provides two adjacent laps (between the front rollers and the intermediate group) moving in opposite directions and affording a nip within which a sheet of camelback may be received. After the operator has entered the first sheet from the table 32 he puts in other sheets successively with a slight overlap each on the preceding sheet. The sheets being engaged on opposite faces by the oppositely moving laps of belt are in consequence rolled up tightly into the form of a cylinder. The intermediate rollers are carried at the end of arms 80 pivoted at 81 and loaded by a spring 82 which maintains the proper tension on the belt and compensates for the increase in diameter of the roll of sheets as the roll-forming operation proceeds. When the operation has been completed, the arms 47 are unlatched, and the upper roller of the front pair is raised to open the nip and so permit removal of the cylindrical roll. In order to facilitate a tight centre to the roll, it is preferable to make one or more knife cuts on the leading edge of the first sheet parallel with that edge. Prior to insertion of the sheets in the roll former they are placed for a few minutes in a warming chamber (conveniently heated by low pressure steam) in order to render them sufficiently plastic to be extrudable. The same apparatus and method may be used where the stock material is in the form of ribbon instead of individual sheets.

We claim:

1. For use in conjunction with an extruder operating on plastic material stock in the form of sheets or ribbon, apparatus for forming the stock sheets or ribbon into compact cylindrical rolls for charging into the barrel of the extruder, the material of each roll being tightly wound helically upon itself from a center, comprising an endless belt arranged for traversing over a guide track, a track-defining roller assembly including two front rollers one above the other, a back roller spaced horizontally from the front rollers, and intermediate rollers between the front and back rollers, said track-defining rollers being arranged to constrain the belt to provide upper and lower laps disposed to form a V-shaped horizontally extending pocket affording at the front rollers an entry mouth for the reception of the stock and in the region of the intermediate rollers a constriction, and means for so driving the belt that the upper and lower laps extending between the front and intermediate rollers move in opposite directions.

2. Apparatus according to claim 1 combined with a mounting for the upper roller of the front pair, said mounting comprising roller-carrying arms pivoted near the intermediate rollers and movable about their pivots to widen the mouth of the pocket to permit removal of the formed cylindrical roll of stock.

3. Apparatus according to claim 1 combined with spring-controlled pivoted arms carrying the intermediate rollers and arranged to permit bodily movement of said rollers horizontally towards the front rollers in such manner as to compensate for the increase in diameter of the roll of stock as the roll-forming operation proceeds.

References Cited in the file of this patent

UNITED STATES PATENTS

| | | |
|---|---|---|
| 2,742,240 | Stephens et al. | Apr. 17, 1956 |
| 2,830,775 | Kiesel | Apr. 15, 1958 |